United States Patent
Kang et al.

(10) Patent No.: US 10,503,334 B2
(45) Date of Patent: *Dec. 10, 2019

(54) DRIVER INTEGRATED CIRCUIT AND DISPLAY APPARATUS INCLUDING THE SAME

(71) Applicant: LG Display Co., Ltd., Seoul (KR)

(72) Inventors: Seong Kyu Kang, Paju-si (KR); Sung Yub Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,140

(22) Filed: Mar. 12, 2018

(65) Prior Publication Data

US 2018/0203545 A1   Jul. 19, 2018

Related U.S. Application Data

(63) Continuation of application No. 15/169,276, filed on May 31, 2016, now Pat. No. 9,939,976, which is a
(Continued)

(30) Foreign Application Priority Data

Sep. 25, 2015   (KR) .......................... 10-2015-0136420

(51) Int. Cl.
*G06F 3/045* (2006.01)
*G06F 3/044* (2006.01)
(Continued)

(52) U.S. Cl.
CPC ............ *G06F 3/044* (2013.01); *G06F 3/0412* (2013.01); *G06F 3/0416* (2013.01);
(Continued)

(58) Field of Classification Search
CPC ...... G06F 3/0412; G06F 3/0416; G06F 3/044; G09G 3/2096; G09G 3/3688;
(Continued)

(56) References Cited

U.S. PATENT DOCUMENTS 8,599,149 B2   12/2013   Lee
2002/0140654 A1*  10/2002   Kim ..................... G02F 1/13452
345/87
(Continued)

FOREIGN PATENT DOCUMENTS

CN         101089687 A    12/2007
CN         101859039 A    10/2010
(Continued)

OTHER PUBLICATIONS

Office Action for U.S. Appl. No. 15/169,276, dated Aug. 24, 2017, 19 Pages.

*Primary Examiner* — Joe H Cheng
(74) *Attorney, Agent, or Firm* — Fenwick & West LLP

(57) ABSTRACT

Disclosed are a driver IC and a display apparatus including the same, which supply a touch auxiliary signal, having the same phase and potential difference as those of a touch signal supplied to a touch electrode which is also used as a common electrode, to a plurality of supply lines disposed in a non-display area during a touch sensing period. The driver IC includes a common voltage supply element, a touch sensing unit, and a common voltage switching unit. The common voltage switching unit connects the common voltage supply element to a plurality of touch electrode lines connected to the plurality of touch electrodes during an image display period, and during a touch sensing period, the common voltage switching unit connects the plurality of touch electrode lines to the touch sensing unit.

20 Claims, 5 Drawing Sheets

Related U.S. Application Data continuation of application No. 14/927,425, filed on Oct. 29, 2015, now Pat. No. 9,377,919.

(51) Int. Cl.
*G09G 3/36* (2006.01)
*G06F 3/041* (2006.01)

(52) U.S. Cl.
CPC ......... *G09G 3/3688* (2013.01); *G09G 3/3696* (2013.01); *G09G 2300/0408* (2013.01); *G09G 2300/0426* (2013.01); *G09G 2310/027* (2013.01); *G09G 2354/00* (2013.01)

(58) Field of Classification Search
CPC ......... G09G 3/3696; G09G 2300/0408; G09G 2300/0426; G09G 2310/0213; G09G 2310/027; G09G 2310/08
See application file for complete search history.

(56) References Cited

U.S. PATENT DOCUMENTS

| | | |
|---|---|---|
| 2007/0285365 A1 | 12/2007 | Lee |
| 2007/0291009 A1 | 12/2007 | Wright et al. |
| 2008/0309623 A1 | 12/2008 | Hotelling et al. |
| 2009/0273578 A1 | 11/2009 | Kanda et al. |
| 2010/0156963 A1 | 6/2010 | Shiomi |
| 2010/0194707 A1 | 8/2010 | Hotelling et al. |
| 2011/0067933 A1 | 3/2011 | Chang et al. |
| 2011/0141042 A1* | 6/2011 | Kim ................... G02F 1/13338 345/173 |
| 2012/0008062 A1* | 1/2012 | Jeong ................. G02F 1/133615 349/58 |
| 2012/0120020 A1 | 5/2012 | Lee |
| 2012/0162134 A1 | 6/2012 | Chen et al. |
| 2012/0319992 A1 | 12/2012 | Lee |
| 2013/0293508 A1 | 11/2013 | Lin et al. |
| 2013/0328807 A1* | 12/2013 | Matsumoto ........... G06F 3/0416 345/173 |
| 2013/0335343 A1 | 12/2013 | Lee et al. |
| 2013/0342479 A1 | 12/2013 | Pyo et al. |
| 2014/0085281 A1* | 3/2014 | Lim ..................... G09G 3/3266 345/206 |
| 2014/0111446 A1 | 4/2014 | Lee et al. |
| 2014/0176459 A1 | 6/2014 | Pyo |
| 2014/0184534 A1 | 7/2014 | Lee et al. |
| 2014/0184539 A1 | 7/2014 | Shin |
| 2014/0184543 A1 | 7/2014 | Kim et al. |
| 2014/0354620 A1* | 12/2014 | Kim ..................... G09G 3/3696 345/212 |
| 2015/0002421 A1 | 1/2015 | Kim et al. |
| 2015/0091850 A1 | 4/2015 | Morein et al. |
| 2015/0130753 A1 | 5/2015 | Woo et al. |
| 2015/0160761 A1 | 6/2015 | Lee et al. |
| 2015/0177880 A1 | 6/2015 | Shin et al. |
| 2015/0243254 A1* | 8/2015 | Choi ........................ G09G 5/18 345/212 |
| 2015/0254491 A1 | 9/2015 | Mo et al. |
| 2016/0012765 A1* | 1/2016 | Jeong ................... G09G 3/3685 345/212 |
| 2016/0026312 A1 | 1/2016 | Park et al. |
| 2017/0076664 A1* | 3/2017 | Nakagawa ........... G09G 3/3266 |
| 2017/0090633 A1 | 3/2017 | Kwon et al. |

FOREIGN PATENT DOCUMENTS

| | | |
|---|---|---|
| CN | 103914175 A | 7/2014 |
| KR | 10-2015-0073042 A | 6/2015 |
| TW | 2014-01129 A | 1/2014 |
| TW | 2014-26455 A | 7/2014 |
| TW | 2014-30670 A | 8/2014 |
| TW | 2015-28101 A | 7/2015 |

\* cited by examiner

DRIVER INTEGRATED CIRCUIT AND DISPLAY APPARATUS INCLUDING THE SAME

CROSS-REFERENCE TO RELATED APPLICATIONS

This application is a continuation application under 35 U.S.C. § 120 of U.S. patent application Ser. No. 15/169,276 filed on May 31, 2016, now U.S. Pat. No. 9,939,976 issued on Apr. 10, 2018, which is a continuation application under 35 U.S.C. § 120 of U.S. patent application Ser. No. 14/927,425 filed on Oct. 29, 2015, now U.S. Pat. No. 9,377,919 issued on Jun. 28, 2016, which claims the benefit of Korean Patent Application No. 10-2015-0136420 filed on Sep. 25, 2015, all of which are hereby incorporated by reference as if fully set forth herein.

BACKGROUND

Field of the Invention

The present invention relates to a driver integrated circuit (IC) and a display apparatus including the same.

Discussion of the Related Art

A touch panel is a type of input device, which is included in display apparatuses such as liquid crystal display (LCD) apparatuses, organic light emitting display apparatuses, etc., and enables a user to input information by directly touching a screen with a finger, a pen, or the like while looking at the screen of a display apparatus.

Recently, the demand for in-cell type display apparatuses is increasing. Such in-cell type displays includes a plurality of elements which configure a touch panel and are built into a display panel to allow the portable terminals such as smartphones, tablet personal computers (PCs), etc. to be made slim.

FIG. 1 is an exemplary diagram showing waveforms of various kinds of signals applied to a related art in-cell type display apparatus.

In the related art in-cell type display apparatus, as shown in FIG. 1, an image display period D and a touch sensing period T are separately executed according to a touch sync signal TSS.

In the image display period D, as shown in FIG. 1, a gate pulse is sequentially supplied to a plurality of gate lines GL1 to GLg, and a common voltage Vcom is supplied to a plurality of touch electrodes TE used as common electrodes. Data voltages are respectively supplied to a plurality of data lines DL.

In the touch sensing period T, a touch signal is supplied to the touch electrodes TE, and thus, a touch is sensed. In this case, as shown in FIG. 1, touch auxiliary signals which are the same as the touch signal are respectively supplied to the gate lines GL1 to GLg and the data lines DL.

According to the above-described driving method, loads of the touch electrodes TE are reduced, and thus, touch sensitivity is enhanced.

For example, in the touch sensing period T, since the touch auxiliary signals that have the same level and phase as those of the touch signal are supplied to the gate lines GL1 to GLg and the data lines DL, a parasitic capacitance does not occur between the touch electrodes and the gate lines GL1 to GLg and between the touch electrodes and the data lines DL. Therefore, touch sensitivity is enhanced.

The touch auxiliary signal supplied to the gate lines is generated by a power supply and then is transferred to a gate driver, which outputs the gate pulses, through a flexible printed circuit board (FPCB) and one of a plurality of supply lines disposed in a non-display area of a panel. The gate driver supplies the touch auxiliary signal to the gate lines during the touch sensing period.

The touch auxiliary signal supplied to the data lines is generated by the power supply and then is transferred to a data driver, which outputs the data voltages, through the FPCB. The data driver supplies the touch auxiliary signal to the data lines during the touch sensing period.

To provide an additional description, since the touch auxiliary signal is supplied to the gate lines and the data lines disposed in a display area, a load is reduced in the display area.

However, as described above, the touch auxiliary signal supplied to the gate lines is supplied to the gate driver through one (for example, a gate low voltage line VGLL through which a gate low voltage VGL is supplied) of the supply lines disposed in the non-display area of the panel. In this case, a parasitic capacitance may be generated between the gate low voltage line VGLL and a plurality of supply lines, through which the touch auxiliary signal is not supplied, among the supply lines disposed in the non-display area, and due to the parasitic capacitance, the touch auxiliary signal cannot normally be supplied to the gate lines.

For example, various kinds of supply lines in addition to the gate low voltage line VGLL are disposed in the non-display area of the panel, and thus, when the touch auxiliary signal is supplied to the gate driver through gate low voltage line VGLL, the parasitic capacitance generated between the gate low voltage line VGLL and the supply lines may act as a load.

Particularly, since each of the supply lines occupies a large area and is disposed all over a long section of the non-display area, a problem is caused by the parasitic capacitance when an LCD apparatus is being driven.

Moreover, a plurality of touch electrode lines which are connected to the touch electrodes to transfer the touch signal and the data lines through which the touch auxiliary signal is supplied are connected to a driver (for example, the data driver) disposed in the non-display area. Outermost lines disposed at an outermost portion among the touch electrode lines and the data lines are adjacent to the supply lines disposed in the non-display area.

For this reason, a parasitic capacitance may be generated between the outermost lines and the supply lines through which the touch auxiliary signal is not supplied. Due to the parasitic capacitance, the touch signal cannot normally be supplied to the touch electrodes, and the touch auxiliary signal cannot normally be supplied to the data lines.

SUMMARY

Accordingly, the present invention is directed to provide a driver integrated circuit (IC) and a display apparatus including the same that substantially obviate one or more problems due to limitations and disadvantages of the related art.

An aspect of the present invention is directed to provide a driver IC and a display apparatus including the same, which supply a touch auxiliary signal, having the same phase and potential difference as those of a touch signal supplied to a touch electrode which is also used as a common electrode, to a plurality of supply lines disposed in a non-display area during a touch sensing period.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display apparatus including: a panel configured to include a plurality of touch electrodes disposed in a display area and a plurality of supply lines which are disposed in a non-display area outside the display area and transfers a plurality of touch auxiliary signals, which have the same phase and potential difference as a phase and a potential difference, respectively, of a touch signal supplied to the plurality of touch electrodes, during a touch sensing period; a driver integrated circuit (IC) configured to supply a common voltage to the plurality of touch electrodes during an image display period, and supply the touch signal to the plurality of touch electrodes during the touch sensing period to receive a plurality of sensing signals from the plurality of touch electrodes; a touch auxiliary signal supply circuit configured to supply the touch auxiliary signals to the plurality of supply lines during the touch sensing period.

In another aspect of the present invention, there is provided a driver integrated circuit (IC) including: a common voltage supply circuit configured to supply a common voltage; a touch sensing circuit configured to receive a touch signal supplied to a plurality of touch electrodes disposed in a panel; and a common voltage switching circuit configured to connect the common voltage supply circuit to a plurality of touch electrode lines connected to the plurality of touch electrodes during an image display period, and connect the plurality of touch electrode lines to the touch sensing unit during a touch sensing period, wherein a phase and a potential difference of the touch signal are the same as a phase and a potential difference, respectively, of a touch auxiliary signal which is supplied to a plurality of supply lines during the touch sensing period. The supply lines are disposed in a non-display area outside a display area of the panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings. In this disclosure below, for convenience of description, an LCD apparatus will be described as an example of the present invention, but the present invention is not limited thereto. That is, the present invention may be applied to various types of display apparatuses that display an image by using a common electrode and a common voltage.

Figure 1:
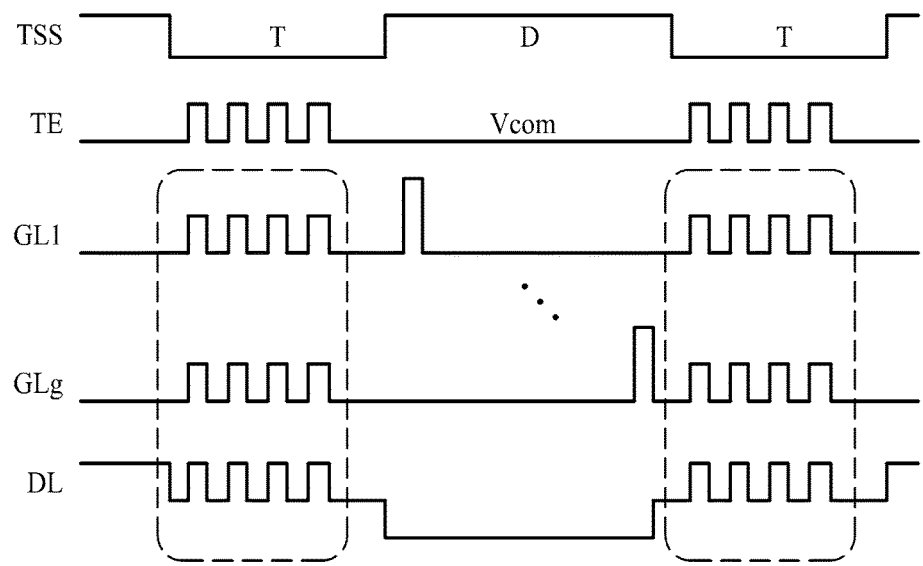
FIG. 1 is an exemplary diagram showing waveforms of various kinds of signals applied to a related art in-cell type display apparatus.
Figure 2:
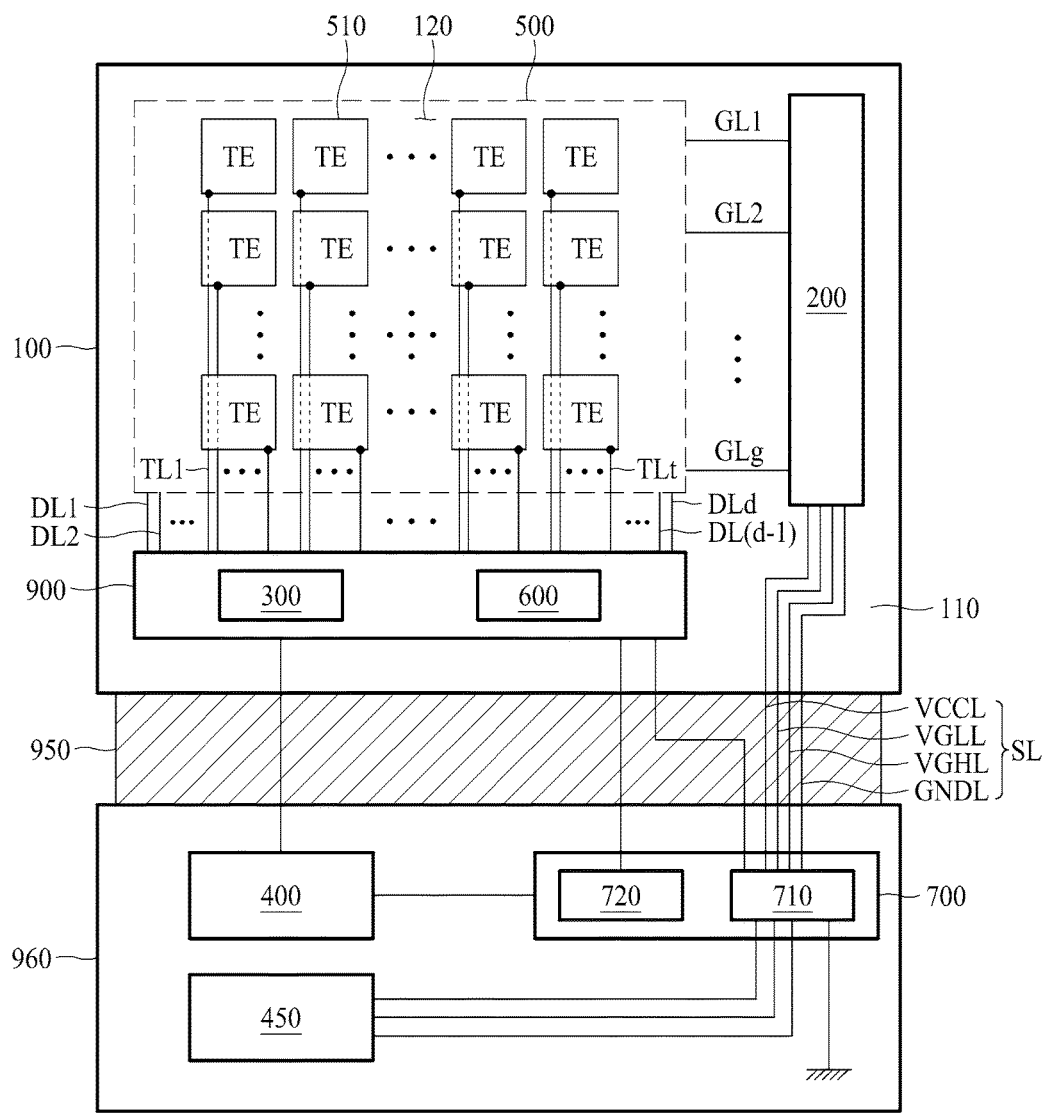
FIG. 2 is an exemplary diagram illustrating a configuration of a display apparatus according to an embodiment of the present invention.

FIG. 2 is an exemplary diagram illustrating a configuration of a display apparatus according to an embodiment of the present invention.

As illustrated in FIG. 2, the display apparatus according to an embodiment of the present invention may include: a panel 100 that includes a display area 120, where a plurality of touch electrodes 510 are disposed, and a non-display area 110 that is disposed outside the display area 120 and where a gate driver 200 and a plurality of supply lines SL connected to the gate driver 200 are disposed; a touch driver 600 that supplies a common voltage to a plurality of touch electrodes (TE) 510 during an image display period and during a touch sensing period, supplies a touch signal to the touch electrodes (TE) 510 to determine whether the panel 100 is touched; a touch auxiliary signal supply unit 710 that supplies a touch auxiliary signal, which is the same as the touch signal, to the supply lines SL during the touch sensing period; a panel driver that drives a plurality of gate lines GL1 to GLg and a plurality of data lines DL1 to DLd included in the panel 100; a printed circuit board (PCB) 960 on which various elements and a controller 400 for driving the panel driver are mounted; and a connection film 950 that electrically connects the panel 100 to the PCB 960. Here, the touch auxiliary signal which is the same as the touch signal may be supplied to the plurality of gate lines GL1 to GLg and the plurality of data lines DL1 to DLd during the touch sensing period. The panel driver may include the gate driver 200, which drives the gate lines, and a data driver 300 that drives the data lines. The connection film 950 may be implemented as a flexible film.

The panel 100 may include a color filter (CF) substrate, a thin film transistor (TFT) substrate on which the gate lines and the data lines are disposed, and a liquid crystal which is injected between the CF substrate and the TFT substrate.

A touch panel 500 including the touch electrodes 510 may be built into the panel 100. Here, the touch electrodes 510 configuring the touch panel 500 may perform a function of a common electrode supplied with a common voltage or a function of a touch sensor supplied with the touch signal.

For example, during the image display period, the common voltage may be supplied to the touch electrodes 510, a data voltage may be supplied to a pixel electrode, included in each of a plurality of pixels, through a corresponding data line, and a gate pulse may be supplied to a corresponding gate line. When the gate pulse is supplied to the corresponding gate line, the liquid crystal may be driven by a difference voltage between the data voltage supplied to the pixel electrode and the common voltage. A transmittance of the liquid crystal may be changed according to the difference voltage, and thus, the panel 100 may display an image.

During the touch sensing period, the touch signal may be supplied to the touch electrodes 510. In this case, the touch driver 600 may receive a plurality of sensing signals from the touch electrodes 510.

In order to perform the above-described function, the TFT substrate may include the gate lines GL1 to GLg, the data lines DL1 to DLd, the common electrodes 510, and a plurality of pixel electrodes (not shown).

Particularly, the common electrodes 510 may be disposed in the display area 120 which displays an image output by the panel 100.

The CF substrate may include a red (R) color filter, a green color filter, and a blue color filter which respectively define a red pixel, a green pixel, and a blue pixel. However, in other embodiments, the color filters may be included in the TFT substrate.

The touch panel 500, as described above, may include the touch electrodes 510.

The touch electrodes 510 may be disposed in the display area 120.

Each of the touch electrodes 510 may be connected to the touch driver 600 through a corresponding touch electrode line TL. For example, when the number of the touch electrodes 510 is "t", t number of touch electrode lines TL1 to TLt may be connected to the touch driver 600.

During the touch sensing period, the touch signal may be supplied to each of the touch electrodes 510. During the image display period, the common voltage may be supplied to each of the touch electrodes 510.

The touch electrodes 510 may be built into the panel 110 in an in-cell type.

A controller 400 may receive a timing signal, including a data enable signal DE, a dot clock CLK, etc., from an external system to generate a plurality of control signals GCS and DCS for controlling operation timings of the gate driver 200 and the data driver 300. Also, the controller 400 may realign input video data received from the external system to output image data, generated through the realignment, to the data driver 300.

Moreover, the controller 400 may generate a control signal (for example, a touch sync signal TSS) for controlling operation timings of an input and an output of the touch driver 600 and may supply the control signal to the touch driver 600.

The touch driver 600 may determine the image display period and the touch sensing period, based on the touch sync signal TSS.

The controller 400 may generate a control signal for controlling the touch auxiliary signal supply unit 710 and may supply the generated control signal to the touch auxiliary signal supply unit 710.

The touch auxiliary signal supply unit 710 may generate the touch auxiliary signal, based on the control signal and may supply the generated touch auxiliary signal to the supply lines SL.

That is, the touch auxiliary signal supply unit 710 may generate the touch auxiliary signal and may supply the generated touch auxiliary signal to the supply lines SL according to the control signal supplied from the controller 400.

The touch auxiliary signal may have the same potential difference and phase as those of the touch signal.

The touch signal may be generated by the touch auxiliary signal supply unit 710.

For example, a signal that is generated by the touch auxiliary signal supply unit 710 and is supplied to the supply lines SL may be the touch auxiliary signal. In this case, the touch auxiliary signal may be supplied to the touch driver 600. The touch auxiliary signal supplied to the touch driver 600 may be supplied as the touch signal to the touch electrodes 510.

The touch auxiliary signal supply unit 710 may also supply the touch auxiliary signal to the gate driver 200 and the data driver 300. In this case, the data driver 300 may supply the touch auxiliary signal to the data lines during the touch sensing period. The gate driver 200 may supply the touch auxiliary signal, which is supplied through one of the supply lines SL, to the gate lines during the touch sensing period.

Subsequently, during the image display period, the data driver 300 may convert the image data, input from the controller 400, into analog data voltages and may respectively supply the data voltages for one horizontal line to the data lines at every one horizontal period where the gate pulse is supplied to one gate line GL. For example, the data driver 300 may convert the image data into the data voltages by using gamma voltages supplied from a gamma voltage generator (not shown) and then, during the image display period, the data driver 300 may respectively output the data voltages to the data lines.

The data driver 300 may supply the touch auxiliary signal to the data lines during the touch sensing period.

In this case, the data driver 300 may autonomously generate the touch auxiliary signal and may supply the generated touch auxiliary signal to the data lines.

Moreover, the data driver 300 may supply the touch auxiliary signal, supplied from the touch auxiliary signal supply unit 710, to the data lines. In this case, the data driver 300 may include a data voltage switching unit. The data voltage switching unit may connect the data lines to the touch auxiliary signal supply unit 710 or a data voltage generator that generates the data voltages.

The gate driver 200 may shift a gate start pulse transferred from the controller 400 according to a gate shift clock to sequentially supply the gate pulse having a gate high voltage VGH to the gate lines GL1 to GLg.

Moreover, the gate driver 200 may supply a gate low voltage VGL to the gate lines GL1 to GLg during the other period where the gate pulse is not supplied.

The gate driver 200 may supply the touch auxiliary signal to the gate lines during the touch sensing period.

In this case, the gate driver 200 may autonomously generate the touch auxiliary signal and may supply the generated touch auxiliary signal to the gate lines.

Moreover, the gate driver 200 may supply the touch auxiliary signal, supplied from the touch auxiliary signal supply unit 710, to the gate lines. In this case, the gate driver 200 may include a gate switching unit. The gate switching unit may connect a corresponding gate line to the touch auxiliary signal supply unit 710 or a stage that outputs the gate pulse.

When the touch sensing period arrives, the touch driver 600 may supply the touch signal or the touch auxiliary signal to the touch electrodes 510 and may receive the sensing signals from the touch electrodes 510.

The touch driver 600 may supply the common voltage to the touch electrodes 510 during the image display period.

To this end, the touch driver 600 may connect the touch electrode lines TL, respectively connected to the touch electrodes 510, to a common voltage supply unit that supplies the common voltage or a touch signal supply unit that supplies the touch signal. As described above, the touch signal may be supplied from the touch auxiliary signal supply unit 710. In this case, the touch auxiliary signal supply unit 710 may be the touch signal supply unit.

The touch signal supply unit and the common voltage supply unit may be included in the touch driver 600. However, in other embodiments, the touch signal supply unit and the common voltage supply unit may be implemented independently from the touch driver 600.

The common voltage may be supplied to the touch electrodes 510 through another path without passing through the touch driver 600.

Hereinabove, the data driver 300, the gate driver 200, the touch driver 600, and the controller 400 have been described as being separately provided. However, in other embodiments, at least two of the data driver 300, the gate driver 200, the touch driver 600, and the controller 400 may be implemented as one IC.

For example, as illustrated in FIG. 2, the data driver 300 and the touch driver 600 may be implemented as one IC, the data driver 300 and the controller 400 may be implemented as one IC, the data driver 300 and the gate driver 200 may be implemented as one IC, and/or the data driver 300, the touch driver 600, and the controller 400 may be implemented as one IC.

The gate driver 200 may be directly built into the non-display area 110 of the panel 100 in a gate-in panel (GIP) type. Alternatively, the gate driver 200 may be implemented as a chip and may be mounted on the non-display area 110.

The data driver 300 may be disposed in the non-display area 110, mounted on the connection film 950, or mounted on the PCB 960.

The touch driver 600 may be disposed in the non-display area 110, mounted on the connection film 950, or mounted on the PCB 960.

As described above, the data driver 300 and the touch driver 600 may be implemented as one body. A device including the data driver 300 and the touch driver 600 which are implemented as one body as illustrated in FIG. 2 may be referred to as a driver IC 900. In this case, the driver IC may be directly built into the non-display area 110 of the panel 100, or the driver IC may be implemented as one chip and may be mounted on the non-display area 110. Alternatively, the driver IC may be implemented as one chip and may be mounted on the connection film 950, or the driver IC may be implemented as one chip and may be mounted on the PCB 960.

The touch auxiliary signal supply unit 710 and the controller 400 may be mounted on the PCB 960. A power supply unit 450, which supplies power necessary to drive the gate driver 200, the data driver 300, the controller 400, the touch driver 600, and the touch auxiliary signal supply unit 710, may be mounted on the PCB 960.

A touch determiner 720, which determines whether the panel 100 is touched and detects a touched position by using a sensing signal received from the touch driver 600, may be mounted on the PCB 960.

However, a combination and arrangement positions of the elements are not limited to the above-described combination and arrangement positions. Therefore, the elements may be combined in various forms, and a device configured by a combination of various elements may be mounted on the panel 100, the connection film 950, or the PCB 960.

The panel driver may include the gate driver 200, which receives the touch auxiliary signal from the touch auxiliary signal supply unit 710 and supplies the touch auxiliary signal to the gate lines during the touch sensing period, and the data driver 300 that receives the touch auxiliary signal from the touch auxiliary signal supply unit 710 and supplies the touch auxiliary signal to the data lines during the touch sensing period.

In this case, the touch auxiliary signal supplied to the gate lines may be generated by the touch auxiliary signal supply unit 710, supplied to the panel 100 through the connection film 950, and supplied to the gate driver 200 through a gate connection line which is disposed in the panel 100. The touch auxiliary signal may be supplied to the gate lines through the gate driver 200.

Moreover, the touch auxiliary signal supplied to the data lines may be generated by the touch auxiliary signal supply unit 710 and may be supplied to the data lines through the data driver 300.

Hereinafter, a display apparatus where all the gate driver 200 and the data driver 300 output the touch auxiliary signal during the touch sensing period will be described as an example of the present invention.

Various kinds of supply lines may be disposed in the non-display area 110 of the panel 100. During the touch sensing period, the touch auxiliary signal may be supplied to the supply lines.

During the image display period, a voltage, a current, or a pulse necessary to drive the gate driver 200, the data driver 300, the touch driver 600, etc. may be supplied to the supply lines.

For example, the supply lines SL may include a gate high voltage line VGHL through which the gate high voltage is supplied to the gate driver 200 during the image display period, a gate low voltage line VGLL through which the gate low voltage is supplied to the gate driver 200 during the image display period, a gate driving voltage line VCCL through which a voltage necessary to drive the gate driver 200 is supplied during the image display period, a ground voltage line GNDL through which the ground voltage is supplied during the image display period, an antistatic line which is disposed for preventing static electricity during the image display period, a voltage supply line through which a voltage necessary to drive elements included in each of the plurality of pixels is supplied during the image display period, a current supply line through which a current necessary to drive the elements included in each pixel is supplied during the image display period, a pulse supply line through which a pulse necessary to drive the elements included in each pixel is supplied during the image display period, a shift clock supply line through which the gate shift clock is supplied to the gate driver 200 during the image display period, and an enable signal supply line through which a gate output enable signal is supplied to the gate driver 200 during the image display period.

A line, which is connected to the gate driver 200, among the supply lines SL, may be referred to as a gate connection line. That is, a plurality of gate connection lines VCCL, VGLL, VGHL and GNDL among the supply lines SL are illustrated in FIG. 2.

During the touch sensing period, the touch auxiliary signal supplied from the touch auxiliary signal supply unit 710 may be supplied to the gate driver 200 through a plurality of gate connection lines (for example, the gate high voltage line VHGL, the gate low voltage line VGLL, the gate driving voltage line VCCL, the ground voltage line GNDL, and/or the like). The touch auxiliary signal supplied to the gate driver 200 may be supplied to the gate lines.

According to the present embodiment, the touch auxiliary signal may be supplied to the gate connection lines disposed in the non-display area. Also, during the touch sensing period, the touch auxiliary signal may be supplied to all the supply lines including the gate connection lines. Also, during the touch sensing period, the touch auxiliary signal may be supplied to only some supply lines adjacent to each other among the supply lines.

The touch auxiliary signal may be supplied from the touch auxiliary signal supply unit 710, included in the PCB 960, to the supply lines SL through a plurality of electricity lines included in the connection film 950. Therefore, as illustrated in FIG. 2, the supply lines SL may be disposed in an area adjacent to the connection film 950 in the non-display area. In one embodiment, the supply lines SL may transfer supply signals from outside the panel 100 to parts of the circuitry inside the panel 100.

Moreover, the touch auxiliary signal may be supplied from the touch auxiliary signal supply unit 710, included in the PCB 960, to the data driver 300 and the touch driver 600 through the plurality of electricity lines included in the connection film 950. Therefore, the data driver 300 and the touch driver 600 may be disposed in an area adjacent to the connection film 950.

Therefore, some data lines disposed at an outermost portion among the plurality of data lines connected to the data driver 300 may be adjacent to the supply lines SL, and some touch electrode lines disposed at an outermost portion among the plurality of touch electrode lines connected to the touch driver 600 may be adjacent to the supply lines SL.

Moreover, as illustrated in FIG. 2, the gate driver 300 may be disposed in an area adjacent to the connection film 950 in the non-display area. Therefore, the gate connection lines VCCL, VGLL, VGHL and GNDL connected to the gate driver 200 among the supply lines SL may be disposed between the connection film 950 and the gate driver 200. In one embodiment, the gate connection lines VCCL, VGLL, VGHL and GNDL may connect VCCL, VGLL, VGHL and GNDL signals from outside the panel 100 to the gate driver 200.

Supply lines other than the gate connection lines may be disposed in an area adjacent to the connection film 950.

The reason that the touch auxiliary signal is supplied to the supply lines during the touch sensing period is as follows.

Generally, a direct current (DC) voltage or an alternating current (AC) current may be supplied through the supply lines including the gate connection lines. For example, during the touch sensing period, if the touch auxiliary signal is supplied to only one of the gate connection lines connected to the gate driver 200, a parasitic capacitance occurs between the supply lines, through which the DC voltage is supplied, and a gate connection line through which the touch auxiliary signal is supplied.

To provide an additional description, the touch auxiliary signal supplied to the gate lines may be supplied through, for example, the gate low voltage line VGLL during the touch sensing period T. Since the gate low voltage line VGLL is disposed in the non-display area 110 to pass through the connection film 950, a parasitic capacitance occurs between the gate low voltage line VGLL and supply lines near the gate low voltage line VGLL until the touch auxiliary signal is supplied to the gate lines. Due to the parasitic capacitance, the touch auxiliary signal may be delayed, or the characteristic of the touch auxiliary signal may be changed. Particularly, since the supply lines disposed in the non-display area 110 have a large area and are disposed all over a long section, an influence of the parasitic capacitance is large.

Moreover, in FIG. 2, a d-1st data line and a dth data line disposed at an outermost portion among the data lines DL1 to DLd may be adjacent to the gate connection lines VCCL, VGLL, VGHL and GNDL. In this case, during the touch sensing period, when the touch auxiliary signal is supplied to only the gate low voltage line VGLL, a parasitic capacitance occurs between the data lines DL(d−1) and DLd, through which the touch auxiliary signal is supplied, and the gate connection lines VCCL, VGHL and GNDL through which the DC voltage is supplied.

Moreover, in FIG. 2, a t-1st touch electrode line and a t-th touch electrode lines TLt disposed at an outermost portion among the touch electrode lines TL1 to TLt may be adjacent to the gate connection lines VCCL, VGLL, VGHL and GNDL. In this case, during the touch sensing period, when the touch auxiliary signal is supplied to only the gate low voltage line VGLL, a parasitic capacitance occurs between the t-1st and tth touch electrode lines TLt, through which the touch signal is supplied, and the gate connection lines VCCL, VGHL and GNDL through which a direct current (DC) voltage.

According to the present embodiment, the touch auxiliary signal may be supplied to the gate connection lines disposed in the non-display area 110 during the touch sensing period, for preventing the parasitic capacitance from occurring. Also, during the touch sensing period, the touch auxiliary signal may be supplied to supply lines adjacent to the gate connection lines and supply lines adjacent to lines disposed at an outermost portion among the touch electrode lines and the data lines. Therefore, a load between the supply lines is reduced, a load between the data lines and the supply lines is reduced, and a load between the touch electrode lines and the supply lines is reduced. Accordingly, the characteristic of the touch auxiliary signal supplied to the data lines and the gate lines is not changed, and the characteristic of the touch signal supplied to the touch electrodes is not changed. Accordingly, touch characteristic is improved.

Figure 3:
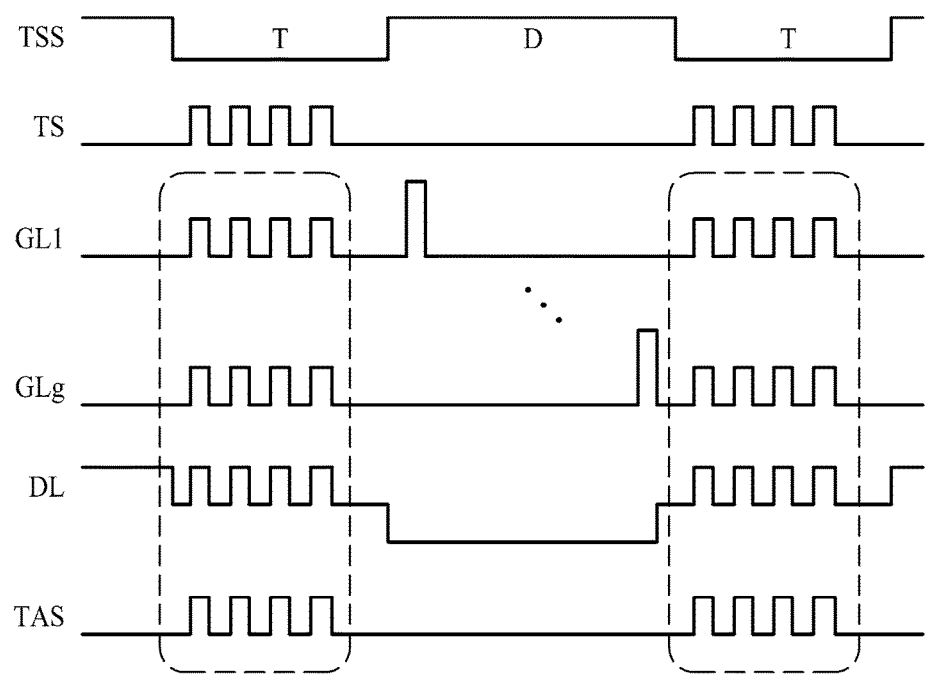
FIG. 3 is an exemplary diagram showing waveforms of various kinds of signals applied to a display apparatus according to an embodiment of the present invention.

FIG. 3 is an exemplary diagram showing waveforms of various kinds of signals applied to a display apparatus according to an embodiment of the present invention. A method of driving a display apparatus according to an embodiment of the present invention will be described with reference to FIG. 3.

First, during the image display period D, the common voltage may be supplied to the touch electrodes 510 disposed in the display area 120 of the panel 100, and thus, the panel 100 may display an image.

In this case, a data voltage may be supplied to the pixel electrode included in each of the pixels through a corresponding data line DL, and the gate pulse may be supplied to a corresponding gate line GL.

When the gate pulse is supplied to the corresponding gate line, the liquid crystal may be driven by a difference voltage between the data voltage supplied to the pixel electrode and the common voltage. A transmittance of the liquid crystal may be changed according to the difference voltage, and thus, the panel 100 may display an image.

Second, during the touch sensing period T, the touch signal TS may be supplied to the touch electrodes (TE) 510.

In this case, the touch auxiliary signal TAS which is the same as the touch signal TS may be supplied to the gate connection lines VCCL, VGLL, VGHL and GNDL disposed in the non-display area 110 and the gate lines GL1 to GLg and the data lines DL1 to DLd included in the panel 100. Also, the touch auxiliary signal TAS may be supplied to a supply line adjacent to the gate connection lines, a supply line adjacent to the data line DL, and a supply line adjacent to the touch electrode line TL among the supply lines.

Here, the touch auxiliary signal being the same as the touch signal may denote that a phase and a potential difference of the touch auxiliary signal TAS are the same as those of the touch signal TS.

First, a phase of the touch auxiliary signal TAS may be the same as that of the touch signal TS.

Second, a high level and a low level of the touch auxiliary signal TAS may not be the same as those of the touch signal TS, but the potential difference that is a difference value between the high level and the low level of the touch auxiliary signal may be the same as the potential difference that is a difference value between a high level and a low level of the touch signal. In other words, the potential difference of the touch auxiliary signal TAS may be the voltage swing around an average voltage level of the touch auxiliary signal TAS, which may be the same as the voltage swing around an average voltage level of the touch signal.

For example, when the high level of the touch signal is 8 V and the low level of the touch signal is 2 V, the potential difference of the touch signal may be 6 V.

In this case, the high level of the touch auxiliary signal supplied to the gate high voltage line VGHL may be 27 V, and the low level of the touch auxiliary signal may be 21 V. Therefore, the potential difference of the touch signal and the potential difference of the touch auxiliary signal supplied to the gate high voltage line VGHL may have the same voltage value "6 V".

Moreover, when the high level of the touch auxiliary signal supplied to the gate high voltage line VGHL is 27 V and the low level of the touch auxiliary signal is 21 V, the high level of the touch auxiliary signal supplied to the gate driving voltage line VCCL may be 6.3 V, and the low level of the touch auxiliary signal may be 0.3 V. Therefore, the potential difference of the touch auxiliary signal supplied to the gate high voltage line VGHL, the potential difference of the touch signal supplied to the gate high voltage line VGHL, and the potential difference of the touch auxiliary signal supplied to the gate driving voltage line VCCL may have the same voltage value "6 V".

To provide an additional description, the phase of the touch auxiliary signal TAS may be the same as that of the touch signal TS, and the potential difference that is the difference value between the high level and the low level of the touch auxiliary signal TAS may be the same as the potential difference that is the difference value between the high level and the low level of the touch signal TS.

Therefore, the high level and the low level themselves of the touch auxiliary signal supplied to the gate connection lines may be the same as or different from those of the touch auxiliary signal supplied to the supply lines.

Hereinafter, a display apparatus where the touch auxiliary signal is supplied to the supply lines including the gate connection lines, the data lines, and the gate lines will be described with reference to FIGS. 2 to 6.

Figure 4:
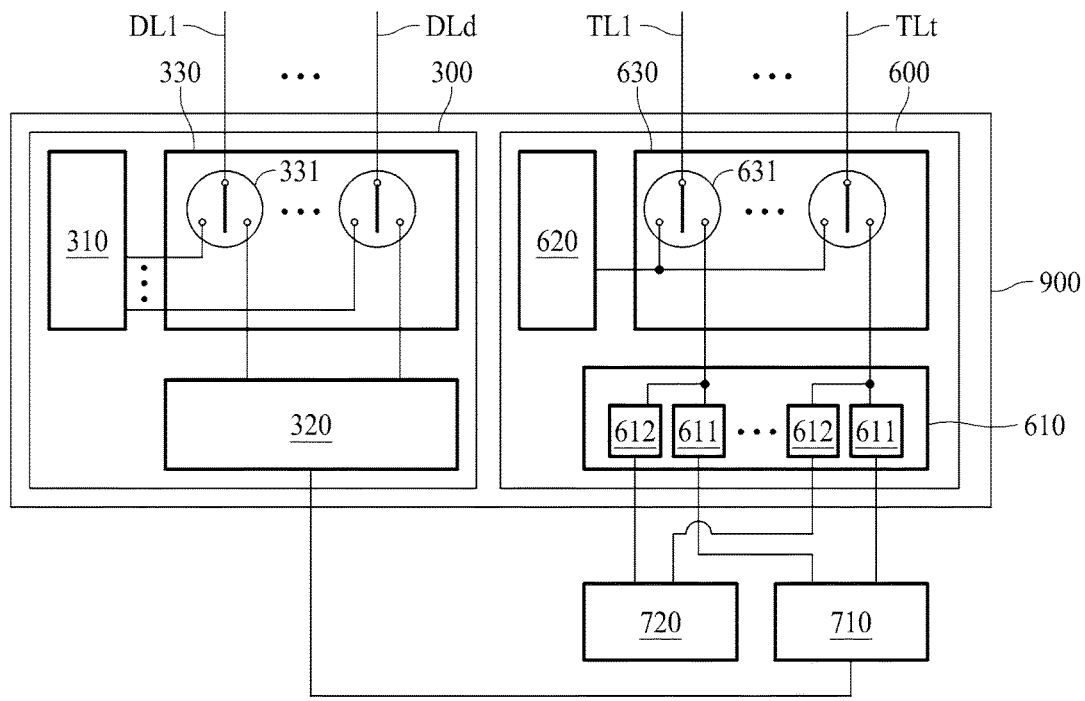
FIG. 4 is a block diagram illustrating an internal configuration of each of a data driver and a touch driver applied to a display apparatus according to an embodiment of the present invention.

FIG. 4 is a block diagram illustrating an internal configuration of each of the data driver and the touch driver applied to the display apparatus according to an embodiment of the present invention.

First, as illustrated in FIG. 4, the data driver 300 may include: a data voltage generator 310 that generates data voltages respectively supplied to the data lines DL1 to DLd; a touch auxiliary signal receiver 320 that is supplied with the touch auxiliary signal; and a data voltage switching unit 330 that connects the data lines to the data voltage generator 310 during the image display period and during the touch sensing period, connects the data lines to the touch auxiliary signal receiver 320.

The data voltage generator 310 may perform a function of a general data driver. Therefore, the data voltage generator 310 may convert image data, transferred from the controller 400, into the data voltages.

The touch auxiliary signal receiver 320 may receive the touch auxiliary signal from the touch auxiliary signal supply unit 710 and may supply the touch auxiliary signal to the data voltage switching unit 330.

The touch auxiliary signal receiver 320 may be a terminal that connects the touch auxiliary signal supply unit 710 to the data voltage switching unit 330.

The data voltage switching unit 330 may include a plurality of data voltage switches 331. Each of the data voltage switches 331 may connect a corresponding data line to the data voltage generator 310 or the touch auxiliary signal receiver 320.

The data voltage switches 331 may be driven by the touch sync signal transferred from the controller 400, or may be controlled by another control signal.

Each of the data voltage switches 331 may connect a corresponding data line to the touch auxiliary signal receiver 320 during the touch sensing period. Therefore, the touch auxiliary signal may be supplied to the data lines during the touch sensing period.

Each of the data voltage switches 331 may connect a corresponding data line to the data voltage generator 310 during the image display period. Therefore, during the image display period, data voltages may be respectively supplied to the data lines, thereby displaying an image.

Second, the touch driver 600 may include: a common voltage supply element 620 that supplies the common voltage; a touch sensing unit 610 that is supplied with the touch signal; and a common voltage switching unit 630 that connects the common voltage supply element 620 to the touch electrode lines connected to the touch electrodes during the image display period and during the touch sensing period, connects the touch electrode lines to the touch sensing unit 610.

The common voltage supply element 620 may supply the common voltage, supplied from the common voltage supply unit, to the common voltage switching unit 630. In this case, the common voltage supply element 620 may be a terminal that connects the common voltage supply unit to the common voltage switching unit 630.

The common voltage supply element 620 may autonomously generate the common voltage and may supply the generated common voltage to the common voltage switching unit 630. In this case, the common voltage supply element 620 may be the common voltage supply unit.

The touch sensing unit 610 may transfer a plurality of sensing signals, received from the touch electrodes, to the touch determiner 720. The touch determiner 720 may be included in the touch driver 600, or as illustrated in FIG. 2, the touch determiner 720 may be implemented independently from the touch driver 600. The touch determiner 720 may determine whether the panel 100 is touched, based on the sensing signals.

The touch sensing unit 610 may transfer the touch auxiliary signal to the common voltage switching unit 630, and as described above, the touch sensing unit 610 may transfer the sensing signals to the touch determiner 720.

The common voltage switching unit 630 may include a plurality of common voltage switches 631. Each of the common voltage switches 631 may connect a corresponding touch electrode line TL to the common voltage generator 620 or the touch sensing unit 610.

The common voltage switches 631 may be driven by the touch sync signal transferred from the controller 400, or may be controlled by another control signal.

Each of the common voltage switches 631 may connect a corresponding touch electrode line to the touch sensing unit 610 during the touch sensing period. Therefore, the touch signal may be supplied to the touch electrode lines during the touch sensing period.

Each of the common voltage switches 631 may connect a corresponding touch electrode line to the common voltage generator 620 during the image display period. Therefore, during the image display period, the common voltage may be supplied to the touch electrodes, thereby displaying an image.

In this case, the touch sensing unit 610 may include at least one touch signal receiver 611 and a plurality of sensing signal receivers 612.

Each of the sensing signal receivers 612 may be connected to a corresponding common voltage switch 631 and the touch determiner 720. Therefore, each of the sensing signal receivers 612 may supply a sensing signal, received through a corresponding touch electrode line and a corresponding common voltage switch 631, to the touch determiner 720.

The touch signal receiver 611 may be connected to the touch auxiliary signal supply unit 710 and a corresponding common voltage switch 631. The touch signal receiver 611 may supply the touch auxiliary signal, supplied from the touch auxiliary signal supply unit 710, to a corresponding touch electrode through the corresponding common voltage switch 631. The touch signal may be a signal which is the same as the touch auxiliary signal. Therefore, the touch auxiliary signal may be used as the touch signal. For example, when the phase, potential difference, high level, and low level of the touch auxiliary signal are the same as those of the touch signal, the touch auxiliary signal may be used as the touch signal.

To provide an additional description, a signal supplied through the supply line from the touch auxiliary signal supply unit 710 may be the touch auxiliary signal, and a signal supplied from the touch auxiliary signal supply unit 710 to the touch driver 600 may be the touch auxiliary signal.

Figure 5:
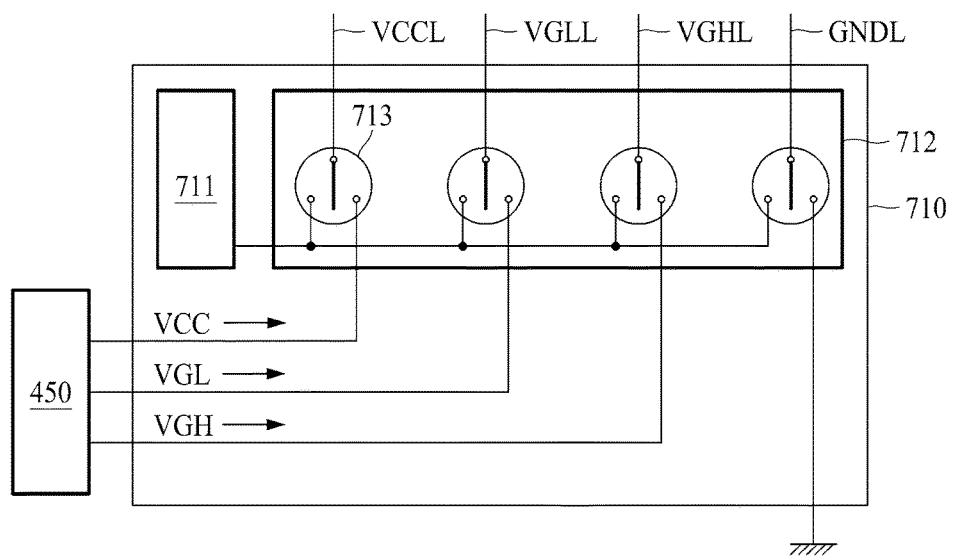
FIG. 5 is a block diagram illustrating an internal configuration of a touch auxiliary signal supply unit applied to a display apparatus according to an embodiment of the present invention.

FIG. 5 is a block diagram illustrating an internal configuration of the touch auxiliary signal supply unit applied to a display apparatus according to an embodiment of the present invention.

The touch auxiliary signal supply unit 710 may include: a touch auxiliary signal generator 711 that generates the touch auxiliary signal; and a touch auxiliary signal switching unit 712 that connects the gate connection lines to the touch auxiliary signal generator 711 during the touch sensing period, and connects the gate connection lines to the power supply unit 450 generating power necessary to drive the gate driver 200 during the image display period.

The touch auxiliary signal generator 711 may generate the touch auxiliary signal.

The touch auxiliary signal switching unit 712 may include a plurality of touch auxiliary signal switches 713. Each of the touch auxiliary signal switches 713 may connect a corresponding gate connection line to the touch auxiliary signal generator 711 or the power supply unit 450.

The touch auxiliary signal switches 713 may be driven by the touch sync signal transferred from the controller 400, or may be controlled by another control signal.

Each of the touch auxiliary signal switches 713 may connect a corresponding gate connection line to the touch auxiliary signal generator 711 during the touch sensing period. Therefore, the touch auxiliary signal may be supplied to the gate connection lines during the touch sensing period.

Each of the gate connection lines may be any one of the gate driving voltage line VCCL, the gate low voltage line VGLL, the gate high voltage line VGHL, the ground voltage line GNDL, the shift clock supply line, and the enable signal supply line.

The touch auxiliary signal switching unit 712 may further include the touch auxiliary signal switches 713 that connect the supply lines, in addition to the gate connection lines, to the touch auxiliary signal generator 711 or the power supply unit 450.

Each of the touch auxiliary signal switches 713 may connect a corresponding gate connection line or a corresponding supply line to the power supply unit 450 during the image display period. Therefore, a specific voltage or current may be supplied to the gate connection lines or the supply lines during the image display period.

The touch determiner 720 and the touch auxiliary signal supply unit 710 may configure a touch processor 700.

The touch processor 700 may supply the touch signal and the touch auxiliary signal to the data driver 300, the touch driver 600, and the supply lines including the gate connection lines. Also, the touch processor 700 may determine whether the panel 100 is touched and detect a touched position, based on the sensing signals received from the touch driver 600.

The touch auxiliary signal generator 711 may generate a plurality of different touch auxiliary signals that have the same phase and potential difference but have different high levels and different low levels. In this case, the touch auxiliary signal generator 711 may supply a corresponding touch auxiliary signal to the touch auxiliary signal switch 713 connected to a supply line corresponding to the corresponding touch auxiliary signal.

The touch auxiliary signal generator 711 may generate the touch signal to transfer the touch signal to the touch driver 600, and the touch auxiliary signal supply unit 710 may further include a separate element for generating the touch signal.

For example, when phases, potential differences, high levels, and low levels of the touch auxiliary signals are the same as those of the touch signal, the touch auxiliary signal generated by the touch auxiliary signal generator 711 may be used as the touch signal.

Moreover, when a phase, a potential difference, a high level, and a low level of at least one of the touch auxiliary signals are the same as those of the touch signal, the at least one touch auxiliary signal may be used as the touch signal.

However, when the phases and potential differences of the touch auxiliary signals are the same as those of the touch signal and the high levels and low levels of the touch auxiliary signals differ from those of the touch signal, the touch auxiliary signal supply unit 710 may further include a separate element for generating the touch signal.

Figure 6:
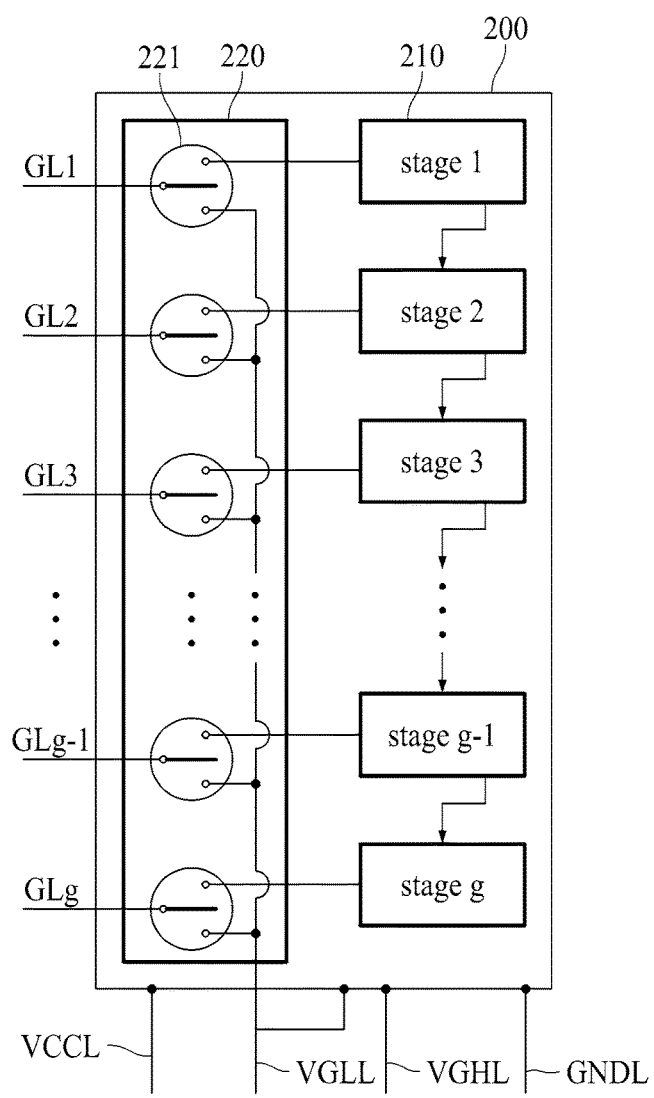
FIG. 6 is a block diagram illustrating an internal configuration of a gate driver applied to a display apparatus according to an embodiment of the present invention.

FIG. 6 is a block diagram illustrating an internal configuration of a gate driver applied to a display apparatus according to an embodiment of the present invention.

As illustrated in FIG. 6, the gate driver 200 may include a plurality of stages 210, which sequentially output the gate pulse, and a gate switching unit 220 that outputs the gate pulse or the touch auxiliary signal to the gate lines.

The stages 210 may have the same configuration as those of the stages 210 that are included in the gate driver 200 and sequentially output the gate pulse, and may perform the same function.

The gate switching unit 220 may include a plurality of gate switches 221.

Each of the gate switches 221 may connect a corresponding gate line to a corresponding stage 210 or a corresponding gate connection line through which the touch auxiliary signal is supplied. The gate low voltage line may be used as each of the gate connection lines through which the touch auxiliary signal is supplied.

During the touch sensing period, each of the gate switches 221 may connect a corresponding gate line to a corresponding gate low voltage line. Therefore, the touch auxiliary signal may be supplied to the gate lines.

During the image display period, each of the gate switches 221 may connect a corresponding gate line to a corresponding stage 210. Therefore, the gate pulse may be supplied to the gate lines.

If stages 210 may be implemented as one chip, the gate switching unit 220 may be included in the chip, or may be disposed outside the chip.

If the stages 210 are built into the panel 100, the gate switching unit 220 may be built into the panel 100.

Hereinafter, the driver IC according to an embodiment of the present invention will be described. In the following description, details which are the same as or similar to the above-described details are not described or will be briefly described.

The driver IC according to an embodiment of the present invention may be built into the non-display area 110 of the panel 100. Alternatively, the driver IC may be implemented as a chip and may be mounted on the non-display area 110 or the PCB 960.

First, the driver IC according to an embodiment of the present invention may include only the touch driver 600.

In this case, the driver IC may include: the common voltage supply element 620 that is supplied with the common voltage; the touch sensing unit 610 that is supplied with the touch signal supplied to the touch electrodes; and the common voltage switching unit 630 that connects the common voltage supply element 620 to the touch electrode lines connected to the touch electrodes during the image display period and during the touch sensing period, connects the touch electrode lines to the touch sensing unit 610.

The touch sensing unit 610 may transfer the sensing signals, received from the touch electrodes, to the touch determiner 720. The touch determiner 720 may determine whether the panel 100 is touched, based on the sensing signals.

Second, the driver IC according to an embodiment of the present invention may include the touch driver 600 and the touch determiner 720.

The touch determiner 720 may determine whether the panel 100 is touched, based on the sensing signals.

Third, the driver IC according to an embodiment of the present invention may include the touch driver 600 and the touch auxiliary signal supply unit 710.

During the touch sensing period, the touch auxiliary signal supply unit 710 may supply the touch signal to the touch sensing unit 610, may transfer the touch auxiliary signal to the supply lines and the data driver 300.

Fourth, the driver IC according to an embodiment of the present invention may include the touch driver 600, the touch auxiliary signal supply unit 710, and the touch determiner 720.

Fifth, as illustrated in FIG. 6, the driver IC according to an embodiment of the present invention may include the touch driver 600 and the data driver 300.

During the touch sensing period, the data driver 300 may receive the touch auxiliary signal from the touch auxiliary signal supply unit 710 and may supply the touch auxiliary signal to the data lines.

Sixth, the driver IC according to an embodiment of the present invention may include the touch driver 600 and the data driver 300. Also, the driver IC according to an embodiment of the present invention may further include at least one of the touch auxiliary signal supply unit 710 and the touch determiner 720.

As described above, according to the embodiments of the present invention, the touch auxiliary signal may be supplied to the supply lines disposed in the non-display area during the touch sensing period. Therefore, a parasitic capacitance between the supply lines is reduced. Thus, the characteristic of the touch auxiliary signal, which is supplied through any one of the supply lines and is supplied to the gate lines disposed in the display area through the gate driver, is not changed. Accordingly, the touch sensitivity and touch characteristic of the display apparatus are enhanced.

Moreover, according to the embodiments of the present invention, during the touch sensing period, the touch auxiliary signal may be supplied to the data lines included in the panel, and the touch signal may be supplied to the touch electrode lines included in the panel. Therefore, a parasitic capacitance does not occur between the supply lines and a data line adjacent to the supply lines among the data lines or between the supply lines and a touch electrode line adjacent to the supply lines among the touch electrode lines. Thus, the characteristic of the touch auxiliary signal supplied through the data line or the touch electrode line is not changed. Accordingly, the touch sensitivity and touch characteristic of the display apparatus are enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus comprising:
   a panel including a plurality of touch electrodes disposed in a display area and one or more supply lines which are disposed in a non-display area outside the display area, the one or more supply lines configured to transfer at least a touch auxiliary signal that has a phase and a potential difference mimicking a phase and a potential difference, respectively, of a touch signal supplied to the plurality of touch electrodes, during a touch sensing period;

a driver integrated circuit (IC) configured to supply the touch signal to the plurality of touch electrodes during the touch sensing period;

a touch auxiliary signal supply circuit configured to supply the touch auxiliary signal to the one or more supply lines during the touch sensing period;

a printed circuit board electrically connected to the panel; and a connection film connected to the panel and the printed circuit board, wherein the connection film comprises one or more electricity lines, and the touch auxiliary signal is supplied to the one or more supply lines through the one or more electricity lines of the connection film during the touch sensing period.

2. The display apparatus of claim 1, further comprising a panel driver circuit configured to drive a plurality of gate lines and a plurality of data lines included in the panel, wherein the panel driver circuit comprises:

a gate driver circuit configured to receive the touch auxiliary signal from the touch auxiliary signal supply circuit to supply the received touch auxiliary signal to the plurality of gate lines during the touch sensing period; or a data driver circuit configured to receive the touch auxiliary signal from the touch auxiliary signal supply circuit to supply the received touch auxiliary signal to the plurality of data lines during the touch sensing period.

3. The display apparatus of claim 2, wherein:

the one or more supply lines include a plurality of gate connection lines disposed in the non-display area and connected from outside the panel to the gate driver circuit, and during the touch sensing period, the touch auxiliary signal supplied from the touch auxiliary signal supply circuit is supplied from outside the panel to the gate driver circuit through the plurality of gate connection lines.

4. The display apparatus of claim 3, wherein during an image display period of the display apparatus, each of the plurality of gate connection lines is any one of a gate high voltage line through which a gate high voltage is supplied to the gate driver circuit, a gate low voltage line through which a gate low voltage is supplied to the gate driver circuit, a gate driving voltage line through which a voltage necessary to drive the gate driver circuit is supplied, a ground voltage line through which a ground voltage is supplied, and an antistatic line for preventing static electricity.

5. The display apparatus of claim 1, wherein the driver IC comprises:

a common voltage supply circuit configured to supply a common voltage;

a touch sensing circuit configured to receive the touch signal; and a common voltage switching circuit configured to connect the common voltage supply circuit to a plurality of touch electrode lines connected to the plurality of touch electrodes during an image display period of the display apparatus, and connect the plurality of touch electrode lines to the touch sensing circuit during the touch sensing period.

6. The display apparatus of claim 1, wherein the one or more supply lines transfer a voltage, a current, or a pulse necessary for operation of the panel during an image display period of the display apparatus.

7. The display apparatus of claim 1, wherein the one or more supply lines are configured to transfer at least another touch auxiliary signal that has a phase and a potential difference mimicking a phase and a potential difference, respectively, of the touch signal supplied to the plurality of touch electrodes, during the touch sensing period, and wherein the touch auxiliary signal and said another touch auxiliary signal have different high levels and different low levels.

8. The display apparatus of claim 1, wherein the touch auxiliary signal supply circuit is mounted on the printed circuit board.

9. The display apparatus of claim 1, wherein the driver integrated circuit (IC) is configured to supply a common voltage to the plurality of touch electrodes during an image display period of the display apparatus.

10. The display apparatus of claim 1, wherein the display apparatus is an organic light emitting display apparatus.

11. A driver integrated circuit (IC) for a display apparatus, the display apparatus comprising a panel including a plurality of touch electrodes disposed in a display area and one or more supply lines which are disposed in a non-display area outside the display area, a touch auxiliary signal supply circuit, a printed circuit board electrically connected to the panel, and a connection film connected to the panel and the printed circuit board, wherein the one or more supply lines are configured to transfer at least a touch auxiliary signal that has a phase and a potential difference mimicking a phase and a potential difference, respectively, of a touch signal supplied to the plurality of touch electrodes, during a touch sensing period, the driver integrated circuit (IC) is configured to supply the touch signal to the plurality of touch electrodes during the touch sensing period, the touch auxiliary signal supply circuit is configured to supply the touch auxiliary signal to the one or more supply lines during the touch sensing period, the connection film comprises one or more electricity lines, and the touch auxiliary signal is supplied to the one or more supply lines through the one or more electricity lines of the connection film during the touch sensing period.

12. The driver IC of claim 11, further comprising a touch sensing circuit, wherein the touch sensing circuit is configured to receive a touch signal to be supplied to a plurality of touch electrodes disposed in the panel of the display apparatus, wherein the touch sensing circuit transfers a plurality of sensing signals, respectively received from the plurality of touch electrodes, to a touch determiner circuit that is provided separately from the driver IC, and the touch determiner circuit determines whether the panel is touched, based on the plurality of sensing signals.

13. The driver IC of claim 11, further comprising a touch determiner circuit configured to determine whether the panel is touched, and wherein:

the touch sensing circuit transfers a plurality of sensing signals, respectively received from the plurality of touch electrodes, to the touch determiner circuit, and the touch determiner circuit determines whether the panel is touched, based on the plurality of sensing signals.

14. The driver IC of claim 11, further comprising a common voltage supply circuit, wherein the common voltage supply circuit is configured to supply a common voltage to a plurality of touch electrode lines respectively connected to the plurality of touch electrodes during an image display period of the display apparatus, and to supply the touch signal to the plurality of touch electrode lines during the touch sensing period.

15. The driver IC of claim 11, wherein
the one or more supply lines include a plurality of gate connection lines,
the touch auxiliary signal supply circuit transfers the touch auxiliary signal to the plurality of gate connection lines disposed in the non-display area of the panel, and
the plurality of gate connection lines comprise at least two of a gate high voltage line through which a gate high voltage is supplied to a gate driver circuit of the display apparatus, a gate low voltage line through which a gate low voltage is supplied to the gate driver circuit, a gate driving voltage line through which a voltage necessary to drive the gate driver circuit is supplied, a ground voltage line through which a ground voltage is supplied, and an antistatic line for preventing static electricity, during an image display period of the display apparatus.

16. The driver IC of claim 11, further comprising a data driver circuit configured to receive the touch auxiliary signal from the touch auxiliary signal supply circuit to supply the received touch auxiliary signal to the plurality of data lines during the touch sensing period.

17. The driver IC of claim 14, wherein the one or more supply lines transfer a voltage or a current necessary for operation of the panel during an image display period of the display apparatus.

18. The driver IC of claim 11, wherein:
the one or more supply lines include a plurality of gate connection lines disposed in the non-display area and connected from outside the panel to a gate driver circuit of the display device, the gate driver circuit configured to drive gate lines of the display device, and
during the touch sensing period, the touch auxiliary signal supplied from the touch auxiliary signal supply circuit is supplied from outside the panel to the gate driver circuit through the plurality of gate connection lines.

19. The display IC of claim 11, wherein the driver IC is configured to supply a common voltage to the plurality of touch electrodes during an image display period of the display apparatus.

20. The display IC of claim 11, wherein the display apparatus is an organic light emitting display apparatus.

* * * * *